(12) United States Patent
Sugita et al.

(10) Patent No.: US 12,541,053 B2
(45) Date of Patent: Feb. 3, 2026

(54) ISOLATOR AND ISOLATOR MANUFACTURING METHOD

(71) Applicants: KYOCERA Corporation, Kyoto (JP); Toyohashi University of Technology, Aichi (JP)

(72) Inventors: Tomoya Sugita, Machida (JP); Taichi Goto, Sendai (JP)

(73) Assignees: KYOCERA Corporation, Kyoto (JP); Toyohashi University of Technology, Aichi (JP)

( * ) Notice: Subject to any disclaimer, the term of this patent is extended or adjusted under 35 U.S.C. 154(b) by 297 days.

(21) Appl. No.: 18/177,624

(22) Filed: Mar. 2, 2023

(65) Prior Publication Data

US 2023/0288633 A1  Sep. 14, 2023

(30) Foreign Application Priority Data

Mar. 9, 2022 (JP) .................. 2022-036555

(51) Int. Cl.
 *G02B 6/12* (2006.01)
(52) U.S. Cl.
 CPC ...... *G02B 6/12* (2013.01); *G02B 2006/12157* (2013.01); *G02B 2006/12173* (2013.01); *G02B 2006/12176* (2013.01)
(58) Field of Classification Search
 CPC ..................................... G02B 6/12
 See application file for complete search history.

(56) References Cited

U.S. PATENT DOCUMENTS

| | | | | |
|---|---|---|---|---|
| 5,706,371 A | * | 1/1998 | Pan | G02B 6/2746 385/11 |
| 5,978,531 A | * | 11/1999 | Funabashi | G02B 6/29317 385/37 |
| 6,118,915 A | * | 9/2000 | Sato | G02B 6/264 385/39 |
| 6,784,764 B2 | * | 8/2004 | Kadota | H03H 9/02669 333/193 |
| 7,321,703 B2 | * | 1/2008 | Fukuyama | G02B 6/4214 385/129 |
| 7,474,826 B2 | * | 1/2009 | Tallone | G02B 6/30 385/88 |

(Continued)

FOREIGN PATENT DOCUMENTS

CN 107870456 A 4/2018
WO 2007/083419 A1 7/2007

*Primary Examiner* — Tina Wong
(74) *Attorney, Agent, or Firm* — Studebaker Brackett PLLC (57) ABSTRACT

An isolator includes a substrate having a substrate surface, a waveguide, a groove, a mask, and a non-reciprocal member. The waveguide is disposed above the substrate surface and has a first surface facing the substrate surface, a second surface opposite the first surface, and a side face connecting the first surface to the second surface. The groove includes a bottom portion and a side portion configured to expose at least part of the side face of the waveguide. The mask is disposed above and overlaps at least a region of the second surface of the waveguide, as viewed in a direction normal to the substrate surface. The region of the second surface of the waveguide is in contact with the groove. The non-reciprocal member is disposed in the groove and is in contact with the side face of the waveguide.

11 Claims, 9 Drawing Sheets

(56) References Cited

U.S. PATENT DOCUMENTS

| | | |
|---|---|---|
| 7,664,346 B2 | 2/2010 | Mizumoto et al. |
| 2004/0067023 A1* | 4/2004 | Hanashima ........ G02B 6/12007 |
| | | 385/50 |
| 2004/0179256 A1 | 9/2004 | Hammer |
| 2005/0008281 A1* | 1/2005 | Higuchi ............. G02B 6/12007 |
| | | 385/14 |
| 2017/0269395 A1* | 9/2017 | Heck ..................... H01S 5/0064 |
| 2023/0324727 A1* | 10/2023 | Goto ..................... G02F 1/0955 |
| | | 385/1 |

* cited by examiner

ISOLATOR AND ISOLATOR MANUFACTURING METHOD

CROSS REFERENCES TO RELATED APPLICATIONS

This application claims the benefit of priority to Japanese Patent Application No. 2022-36555 (filed on Mar. 9, 2022), the entire disclosure of which is incorporated herein by reference.

BACKGROUND OF THE INVENTION

1. Field of the Invention

The present disclosure relates to an isolator and an isolator manufacturing method.

2. Description of the Related Art

Optical isolators including a layer of magneto-optic material (Ce:YIG) as a waveguide layer are known (see, e.g., International Publication No. 2007/083419).

SUMMARY OF THE INVENTION

In an embodiment of the present disclosure, an isolator includes a substrate having a substrate surface, a waveguide, a groove, a mask, and a non-reciprocal member. The waveguide is disposed above the substrate surface. The waveguide has a first surface facing the substrate surface, a second surface opposite the first surface, and a side face connecting the first surface to the second surface. The groove includes a bottom portion and a side portion. The side portion of the groove is configured to expose at least part of the side face of the waveguide. The mask is disposed above and overlaps at least a region of the second surface of the waveguide, as viewed in a direction normal to the substrate surface. The region of the second surface of the waveguide is in contact with the groove. The non-reciprocal member is disposed in the groove and is in contact with the side face of the waveguide.

In another embodiment of the present disclosure, an isolator manufacturing method includes forming a waveguide above a substrate having a substrate surface, forming an insulating layer and a mask above the waveguide, forming a groove by etching the insulating layer and exposing a side face of the waveguide, forming a non-reciprocal member in the groove, and irradiating the non-reciprocal member with laser light of which a transmittance through the mask is less than a transmittance threshold.

DESCRIPTION OF THE PREFERRED EMBODIMENTS

Exemplary Configuration of Isolator 10

Figure 1:
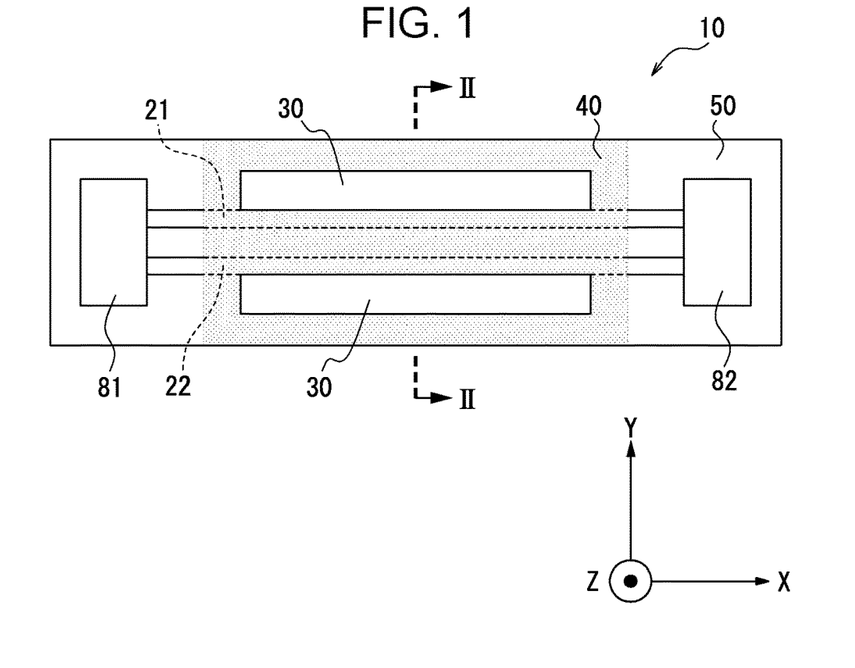
FIG. 1 is a plan view illustrating an exemplary configuration of an isolator according to an embodiment.
Figure 2:
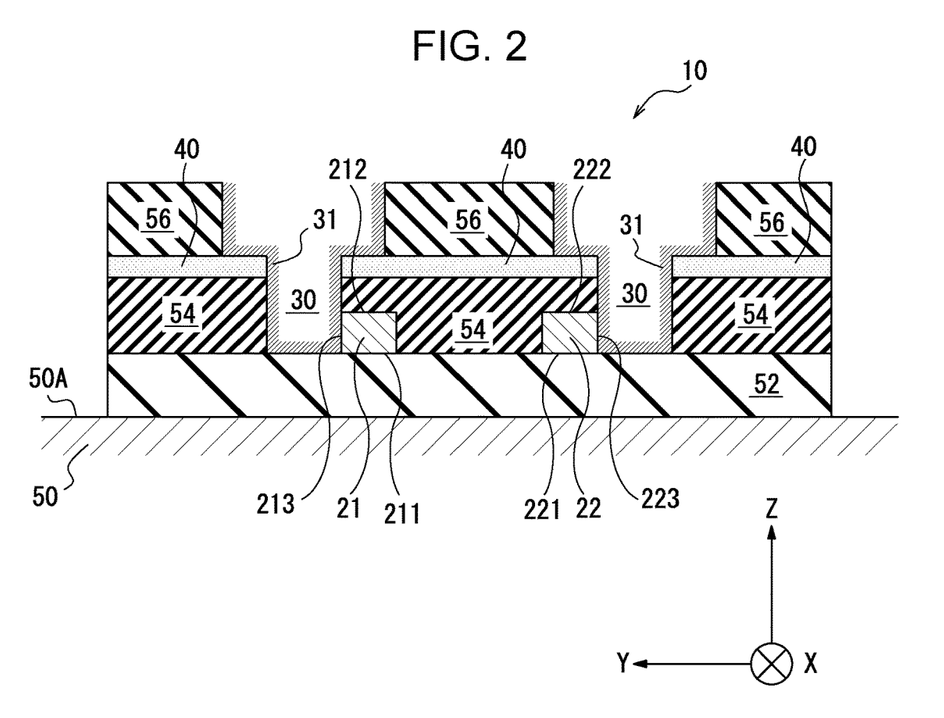
FIG. 2 is a cross-sectional view taken along line II-II in FIG. 1.

As illustrated in FIG. 1 and FIG. 2, in an embodiment, an isolator 10 includes a first waveguide 21, a second waveguide 22, a non-reciprocal member 31, a mask 40, a first branching unit 81, and a second branching unit 82. In the embodiment, the first waveguide 21 and the second waveguide 22 are also simply referred to as waveguides.

The isolator 10 is configured to allow transmission of a transverse electric (TE) mode electromagnetic wave received at the first branching unit 81 to the second branching unit 82, and block transmission of a TE mode electromagnetic wave received at the second branching unit 82 to the first branching unit 81. A direction of propagation of an electromagnetic wave from the first branching unit 81 to the second branching unit 82 is also referred to as a first direction. A direction of propagation of an electromagnetic wave from the second branching unit 82 to the first branching unit 81 is also referred to as a second direction. That is, the isolator 10 allows transmission of a TE mode electromagnetic wave in the first direction, and blocks transmission of a TE mode electromagnetic wave in the second direction.

The isolator 10 achieves asymmetric propagation characteristics of electromagnetic waves by using the principle of asymmetric Mach-Zehnder interferometers. The isolator 10 is configured in such a way that the phase shift of an electromagnetic wave propagating through the first waveguide 21 in the first direction is the same as the phase shift of an electromagnetic wave propagating through the second waveguide 22 in the first direction. The isolator 10 is also configured in such a way that the phase shift of an electromagnetic wave propagating through the first waveguide 21 in the second direction and the phase shift of an electromagnetic wave propagating through the second waveguide 22 in the second direction have a difference equivalent to ¼ of a wavelength (or equivalent to a 90-degree phase).

A phase shift can be adjusted by varying the line length of a waveguide, and can also be adjusted by varying the effective refractive index of the waveguide. The isolator 10 is configured in such a way that in the absence of the non-reciprocal member 31, the phase of an electromagnetic wave propagating through the first waveguide 21 is delayed by 90 degrees with respect to the phase of an electromagnetic wave propagating through the second waveguide 22. In the absence of the non-reciprocal member 31, the phase of an electromagnetic wave propagating through the first waveguide 21 is delayed by 90 degrees with respect to the phase of an electromagnetic wave propagating through the second waveguide 22, regardless of whether the direction of propagation of the electromagnetic wave through the isolator 10 is the first direction or the second direction. This means that even when simply the line length or the effective refractive index of the waveguide is set, the phase shift of an electromagnetic wave propagating in the first direction and the phase shift of an electromagnetic wave propagating in the second direction are the same. To create a difference between the phase shift of an electromagnetic wave propagating through the waveguide in the first direction and the phase shift of an electromagnetic wave propagating through the waveguide in the second direction, the isolator 10 includes the non-reciprocal member 31 disposed along at least part of the waveguide. With the non-reciprocal member 31, the waveguide functions as a non-reciprocal waveguide when applied with a magnetic field.

The non-reciprocal waveguide advances or delays the phase of an electromagnetic wave propagating therethrough. In the present embodiment, the isolator 10 is configured in such a way that when the non-reciprocal member 31 is located to the right of the waveguide as viewed in the propagation direction of an electromagnetic wave, the phase of the electromagnetic wave is delayed by ⅛ of the wavelength (or by 45 degrees). The isolator 10 is also configured in such a way that when the non-reciprocal member 31 is located to the left of the waveguide as viewed in the propagation direction of an electromagnetic wave, the phase of the electromagnetic wave is advanced by ⅛ of the wavelength (or by 45 degrees).

In the example illustrated in FIG. 1, when an electromagnetic wave propagates in the first direction (or toward the positive side of the X axis in FIG. 1), the non-reciprocal member 31 is located to the left of the first waveguide 21 in the first direction. At the same time, the non-reciprocal member 31 is located to the right of the second waveguide 22 in the first direction. Accordingly, the phase of an electromagnetic wave propagating in the first direction is advanced by 45 degrees in the first waveguide 21, and is delayed by 45 degrees in the second waveguide 22. As described above, the isolator 10 is configured in such a way that in the absence of the non-reciprocal member 31, the phase of an electromagnetic wave propagating through the first waveguide 21 in the first direction is delayed by 90 degrees with respect to the phase of an electromagnetic wave propagating through the second waveguide 22 in the first direction. Therefore, the phase of an electromagnetic wave propagating through the first waveguide 21 in the first direction is delayed by 45 degrees, and the phase of an electromagnetic wave propagating through the second waveguide 22 in the first direction is delayed by 45 degrees. This means that the difference between the phase shift of an electromagnetic wave propagating through the first waveguide 21 in the first direction and the phase shift of an electromagnetic wave propagating through the second waveguide 22 in the first direction is 0 degrees. That is, the phase shift of an electromagnetic wave propagating through the first waveguide 21 in the first direction and the phase shift of an electromagnetic wave propagating through the second waveguide 22 in the first direction are the same.

On the other hand, when an electromagnetic wave propagates in the second direction (or toward the negative side of the X axis in FIG. 1), the non-reciprocal member 31 is located to the right of the first waveguide 21 in the second direction. At the same time, the non-reciprocal member 31 is located to the left of the second waveguide 22 in the second direction. Accordingly, the phase of an electromagnetic wave propagating in the second direction is delayed by 45 degrees in the first waveguide 21, and is advanced by 45 degrees in the second waveguide 22. As described above, the isolator 10 is configured in such a way that in the absence of the non-reciprocal member 31, the phase of an electromagnetic wave propagating through the first waveguide 21 in the second direction is delayed by 90 degrees with respect to the phase of an electromagnetic wave propagating through the second waveguide 22 in the second direction. Therefore, the phase of an electromagnetic wave propagating through the first waveguide 21 in the second direction is delayed by 135 degrees, and the phase of an electromagnetic wave propagating through the second waveguide 22 in the second direction is advanced by 45 degrees. This means that the difference between the phase shift of an electromagnetic wave propagating through the first waveguide 21 in the second direction and the phase shift of an electromagnetic wave propagating through the second waveguide 22 in the second direction is 180 degrees.

In the isolator 10 configured as described above, the phase difference between an electromagnetic wave propagating through the first waveguide 21 and an electromagnetic wave propagating through the second waveguide 22 is 0 degrees during propagation in the first direction, whereas it is 180 degrees during propagation in the second direction. The isolator 10 is thus configured to allow transmission of an electromagnetic wave propagating in the first direction and block transmission of an electromagnetic wave propagating in the second direction.

In the isolator 10, the waveguides and the non-reciprocal member 31 are disposed above a substrate 50 having a substrate surface 50A. The substrate 50 may contain a conductor such as metal, a semiconductor such as silicon, glass, or resin. Although the substrate 50 is a silicon (Si) substrate in the present embodiment, it may be made of various other materials.

The substrate 50 is provided with a buried oxide (BOX) layer 52 on the substrate surface 50A. The BOX layer 52 is formed by an insulator, such as a silicon oxide film. The waveguides are disposed on the BOX layer 52. The first waveguide 21 has a first surface 211 facing the substrate surface 50A, a second surface 212 opposite the first surface 211, and a side face 213 connecting the first surface 211 to the second surface 212. The second waveguide 22 has a first surface 221 facing the substrate surface 50A, a second surface 222 opposite the first surface 221, and a side face 223 connecting the first surface 221 to the second surface 222. The substrate 50 is further provided with a first insulating layer 54 on the waveguides. The substrate 50 is further provided with a mask 40 on the first insulating layer 54. The substrate 50 is further provided with a second insulating layer 56 on the mask 40.

The waveguides are surrounded by the BOX layer 52, the first insulating layer 54, and the non-reciprocal member 31. The waveguides may be collectively referred to as a core. The BOX layer 52 and the first insulating layer 54 may be collectively referred to as a cladding. The core and the cladding may contain a dielectric material. The waveguides are also referred to as dielectric lines. The materials of the core and the cladding are determined in such a way that the relative dielectric constant of the core is greater than the relative dielectric constant of the cladding. In other words, the materials of the core and the cladding are determined in such a way that the refractive index of the cladding is greater than the refractive index of the core. With this configuration, all electromagnetic waves propagating through the core can be reflected off the boundary between the core and the cladding. This can reduce loss of electromagnetic waves propagating through the core.

The relative dielectric constants of the core and the cladding may be greater than the relative dielectric constant of air. When the relative dielectric constants of the core and the cladding are greater than the relative dielectric constant of air, leakage of electromagnetic waves from the isolator 10 can be suppressed. This can reduce loss of electromagnetic waves caused by emission from the isolator 10.

Although the waveguides serving as a core are made of silicon (Si) in the present embodiment, they may be made of various other materials. Although the BOX layer 52 and the first insulating layer 54 serving as a cladding are made of quartz glass or silicon oxide films ($SiO_2$) in the present embodiment, they may be made of various other materials. Silicon and quartz glass have relative dielectric constants of about 12 and about 2, respectively. Silicon is capable of allowing low-loss propagation of an electromagnetic wave having a near-infrared wavelength of about 1.2 µm to about 6 µm. A silicon waveguide is capable of allowing low-loss propagation of an electromagnetic wave having a wavelength in the 1.3 µm band or the 1.55 µm band used in optical communications.

The isolator 10 includes grooves 30 formed by etching the first insulating layer 54. The grooves 30 extend along the waveguides. The grooves 30 each include a bottom portion and a side portion in cross-section (see FIG. 2), as viewed in the direction (or X axis direction in FIG. 1) in which the grooves 30 extend. The groove 30 disposed along the first waveguide 21 is configured to expose, at the side portion thereof, at least part of the side face 213 of the first waveguide 21. The groove 30 disposed along the second waveguide 22 is configured to expose, at the side portion thereof, at least part of the side face 223 of the second waveguide 22. The bottom portion of each groove 30 may be disposed at substantially the same position as the lower surface of the waveguide (i.e., the first surface 211 of the first waveguide 21 or the first surface 221 of the second waveguide 22).

The non-reciprocal member 31 is formed by deposition on the bottom and side portions of the groove 30. In the groove 30 disposed along the first waveguide 21, the non-reciprocal member 31 is in contact with the side face 213 of the first waveguide 21. In the groove 30 disposed along the second waveguide 22, the non-reciprocal member 31 is in contact with the side face 223 of the second waveguide 22.

The grooves 30 may each be a stepped groove composed of two parts, one being disposed in the first insulating layer 54 and the other being disposed in the second insulating layer 56. The width of the groove 30 (i.e., the dimension of the groove 30 in the Y axis direction in FIG. 2) in the second insulating layer 56 is greater than the width of the groove 30 in the first insulating layer 54. This facilitates deposition of the non-reciprocal member 31 to the exposed portions of the waveguides. To allow the deposition to the point at which the bottom and side portions of the groove 30 intersect, the non-reciprocal member 31 may be deposited, with the substrate 50 inclined toward the positive or negative side of the Y axis.

Although cerium-substituted yttrium iron garnet (Ce:YIG) is used to make the non-reciprocal member 31 in the present embodiment, the non-reciprocal member 31 may be made of a transparent magnetic material, such as bismuth-substituted YIG (Bi:YIG), which is a partially substituted YIG. A ferromagnetic material, such as FeCo, FeNi, or CoPt, or a material containing a ferromagnetic material, may be used to make the non-reciprocal member 31. A dielectric material obtained by compositing magnetic nanoparticles, such as a nano-granular material, may be used to make the non-reciprocal member 31. Various other magnetic materials may be used to make the non-reciprocal member 31.

The non-reciprocal member 31 made of a YIG-based material exhibits sufficient non-reciprocity by being well crystallized. The crystallization of the non-reciprocal member 31 is promoted by heating the non-reciprocal member 31 to a predetermined temperature or higher. However, considering the influence on the waveguides and other components, such as wiring lines, formed on the substrate 50, it is difficult to heat the entire substrate 50 to a predetermined temperature or higher during deposition of the non-reciprocal member 31. Accordingly, the non-reciprocal member 31 deposited in the groove 30 without heating the substrate 50 is not well crystallized, and does not exhibit sufficient non-reciprocity.

To crystallize the non-reciprocal member 31 in the isolator 10 of the present embodiment, the non-reciprocal member 31 is heated by laser irradiation. The laser light used here is light having a wavelength at which the non-reciprocal member 31 efficiently absorbs the light. Since the non-reciprocal member 31 made of Ce:YIG is capable of efficiently absorbing visible light, a visible-light laser may be used to heat the non-reciprocal member 31.

Laser light diverges from an irradiation point within a finite range defined by optical limitation. The range of laser irradiation is wider than the width of each groove 30. In the isolator 10 of the present embodiment, the mask 40 is configured in such a way that the transmittance of laser light therethrough is less than a transmittance threshold, or that the reflectance of laser light therefrom is greater than or equal to a reflectance threshold. The mask 40 may be made of metal, such as aluminum, but various other materials may be used to make the mask 40. The mask 40 is disposed above in such a way that in plan view of the substrate 50 (i.e., as viewed in a direction normal to the substrate surface 50A), the mask 40 overlaps at least a region of the second surface 212 or 222 of the waveguide in contact with the groove 30. In other words, in plan view of the substrate 50, the mask 40 overlaps the waveguide and does not overlap the groove 30. By overlapping the waveguide with the mask 40, laser light emitted toward the substrate surface 50A of the substrate 50 does not easily reach the waveguide. By not overlapping the groove 30 with the mask 40, laser light can easily reach the non-reciprocal member 31 inside the groove 30. Laser irradiation can thus easily heat only the non-reciprocal member 31 inside the groove 30.

In the isolator 10 of the present embodiment, as described above, the non-reciprocal member 31 is heated in such a way that other components disposed on the substrate 50 are not significantly affected. Therefore, even when a material that requires heating is used to make the non-reciprocal member 31, the influence on the semiconductor process can be reduced. Also, the isolator 10 can achieve improved performance.

The performance of the isolator 10 may change with the degree of crystallization of the non-reciprocal member 31. To adjust the performance of the isolator 10 after completion of production, additional laser irradiation may be performed. In the present embodiment, where the isolator 10 includes the mask 40, even when the non-reciprocal member 31 is subjected to additional laser irradiation, the influence on other components can be reduced.

Figure 3:
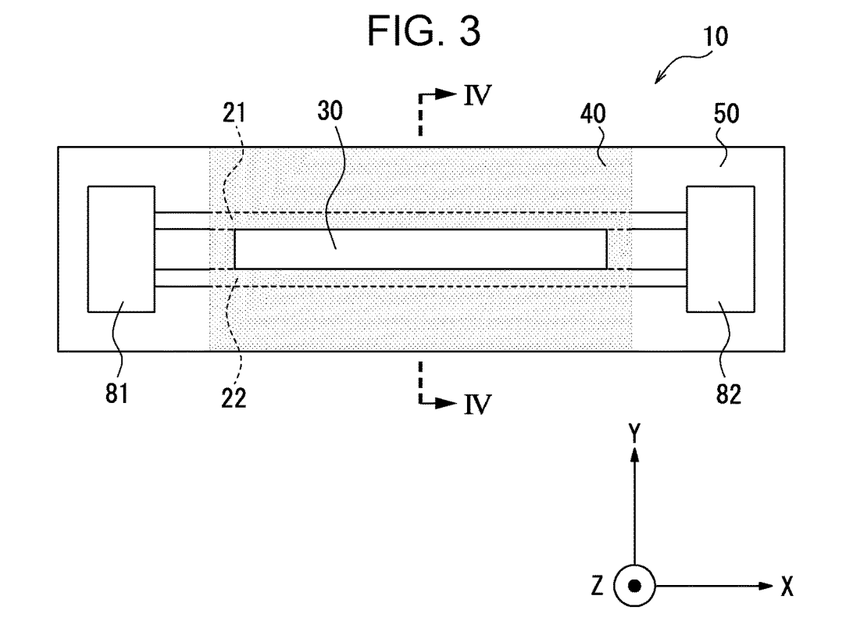
FIG. 3 is a plan view illustrating an exemplary configuration where a groove is interposed between a first waveguide and a second waveguide.
Figure 4:
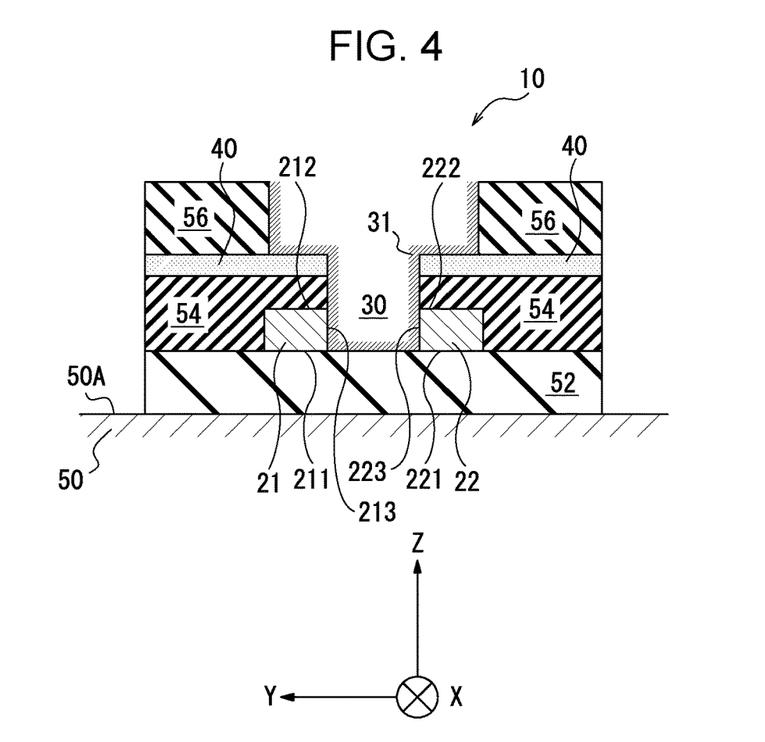
FIG. 4 is a cross-sectional view taken along line IV-IV in FIG. 3.

As illustrated in FIG. 3 and FIG. 4, the groove 30 may be disposed along both the first waveguide 21 and the second waveguide 22. This can reduce the area occupied by the substrate 50 in the isolator 10. That is, the size of the isolator 10 can be reduced. Part of a side portion of the groove 30 at least partially exposing the side face 213 of the first waveguide 21 is also referred to as a first side portion. Part of a side portion of the groove 30 at least partially exposing the side face 223 of the second waveguide 22 is also referred to as a second side portion.

Figure 5:
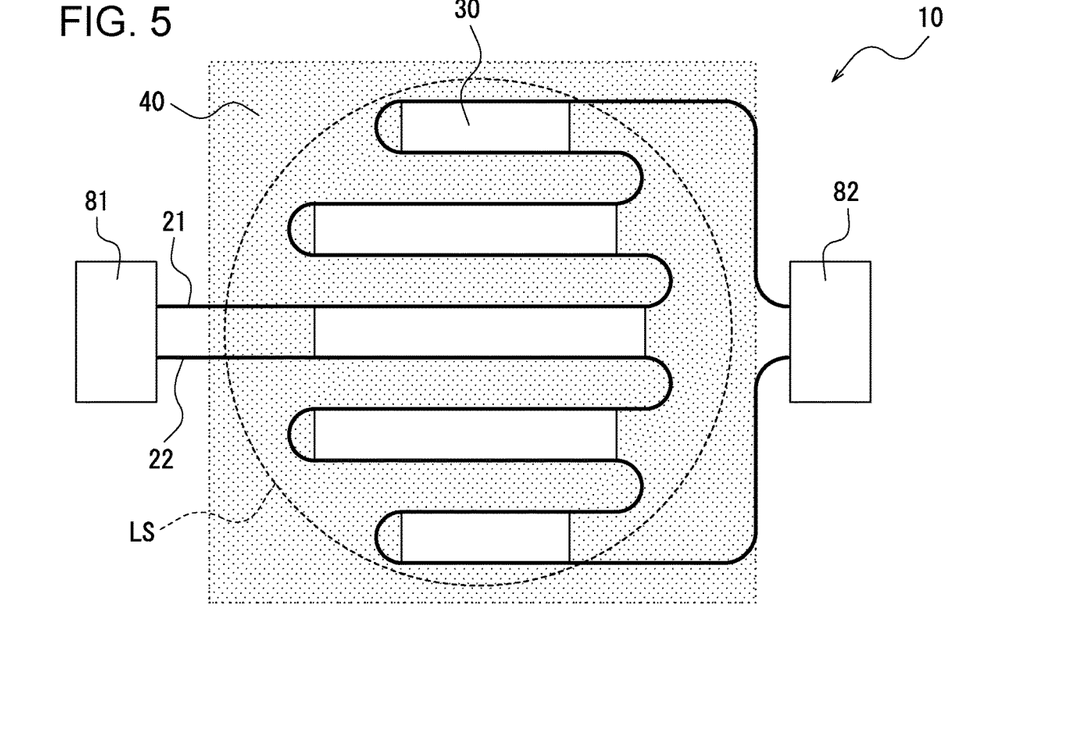
FIG. 5 is a plan view illustrating an exemplary configuration where the first and second waveguides are arranged in a meandering pattern in a substantially circular laser irradiation region and one of grooves is in contact with and common to both the first and second waveguides.
Figure 6:
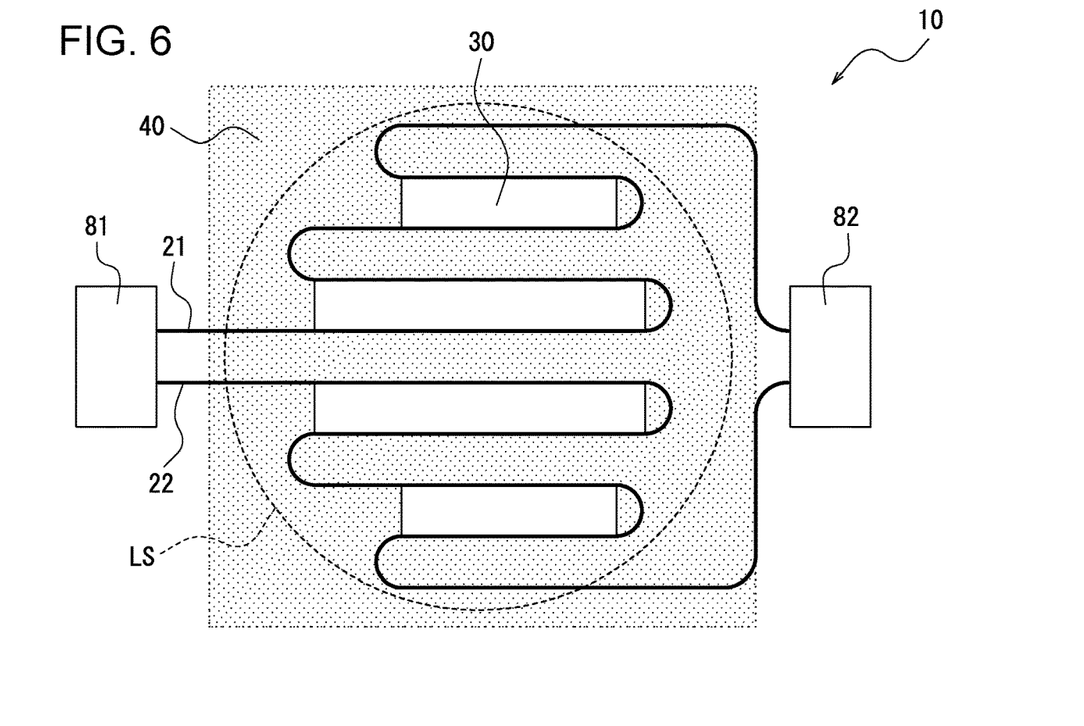
FIG. 6 is a plan view illustrating an exemplary configuration where the first and second waveguides are arranged in a meandering pattern in a substantially circular laser irradiation region and none of grooves is in contact with and common to both the first and second waveguides.

As illustrated in FIG. 5 and FIG. 6, the waveguides may be arranged in a meandering pattern. In other words, the direction in which the waveguides extend may change at multiple points. The waveguides may be arranged in a meandering pattern in a substantially circular region. The waveguides may be arranged inside a substantially circular laser irradiation region LS. This allows effective use of laser light for heating the non-reciprocal member 31, and can also protect other components of the isolator 10 from laser irradiation on the substrate 50.

The waveguides may be arranged in such a way that the directions of electromagnetic waves propagating in adjacent portions of each waveguide are different by 180 degrees. The grooves 30 may each be interposed between adjacent portions of the waveguide where the propagation directions of electromagnetic waves are different by 180 degrees. With this configuration, the non-reciprocal member 31 on both side portions of the groove 30 can be used so that the waveguide can function as a non-reciprocal waveguide.

As illustrated in FIG. 5, the isolator 10 may be configured in such a way that the groove 30 is interposed between the first waveguide 21 and the second waveguide 22. As illustrated in FIG. 6, none of the grooves 30 may be interposed between the first waveguide 21 and the second waveguide 22, so that the degree of freedom in designing the isolator 10 can be improved. In FIG. 6, none of the grooves 30 is shared by the first waveguide 21 and the second waveguide 22. Therefore, even when the non-reciprocal member 31 is asymmetrically deposited on two side portions of any groove 30, the waveguide extending on both sides of the groove 30 can reduce influence of the asymmetric deposition.

Figure 7:
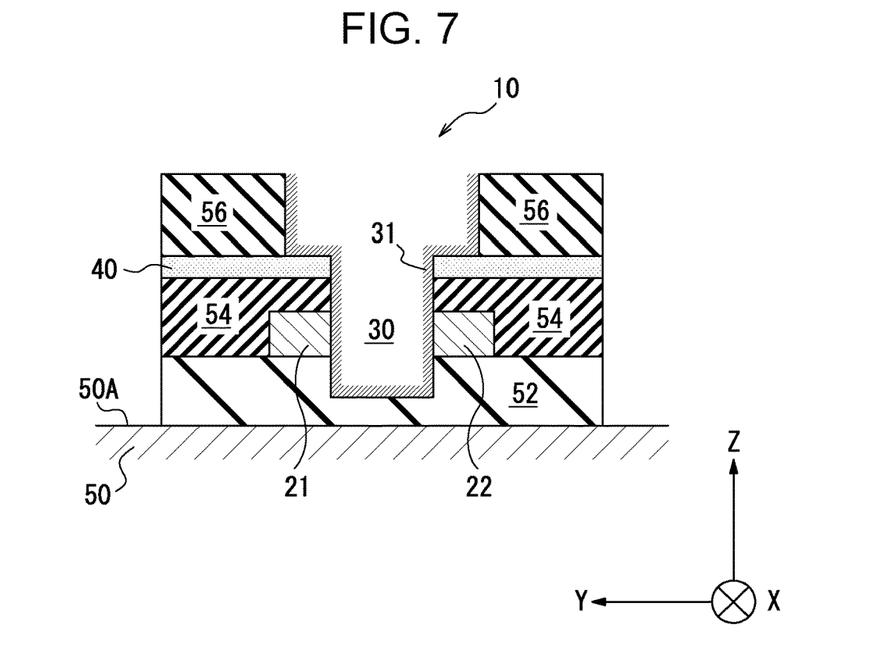
FIG. 7 is a cross-sectional view illustrating an exemplary configuration where a bottom portion of a groove is disposed at a position lower than first surfaces of the waveguides.

As illustrated in FIG. 7, the groove 30 may be formed in such a way that the bottom portion thereof is at a position lower than the first waveguide 21. That is, part of the groove 30 exposing the waveguide may be spaced from the bottom portion of the groove 30. When the non-reciprocal member 31 is deposited inside the groove 30, the non-reciprocal member 31 cannot easily reach the point at which the bottom and side portions of the groove 30 intersect. When the part of the groove 30 exposing the waveguide is spaced from the bottom portion of the groove 30, the non-reciprocal member 31 can be easily deposited in the part of the groove 30 exposing the waveguide. This makes it easier to control the characteristics of the non-reciprocal member 31 in contact with the waveguide, and thus can improve the performance of the isolator 10.

Figure 8:
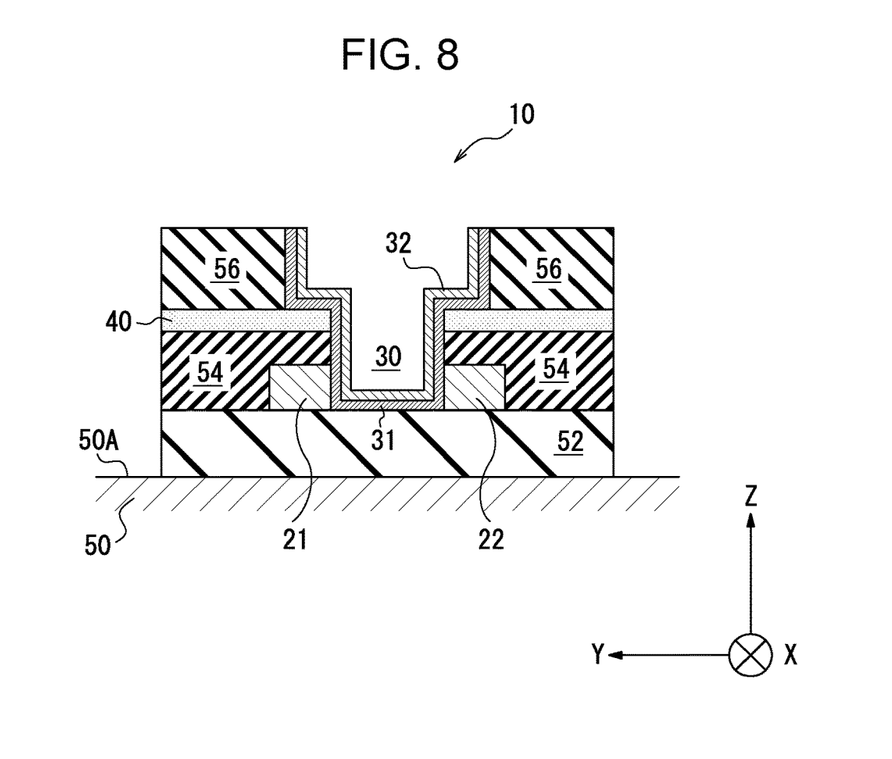
FIG. 8 is a cross-sectional view illustrating an exemplary configuration where a non-reciprocal member is provided with an absorbing member thereon.

As illustrated in FIG. 8, an absorbing member 32 may be added onto the non-reciprocal member 31 in the groove 30. A material capable of efficiently absorbing laser light is used to make the absorbing member 32. A material with absorbing properties different from those of the non-reciprocal member 31 may be used to make the absorbing member 32. A material capable of efficiently absorbing infrared light, such as carbon, may be used to make the absorbing member 32.

Figure 9:
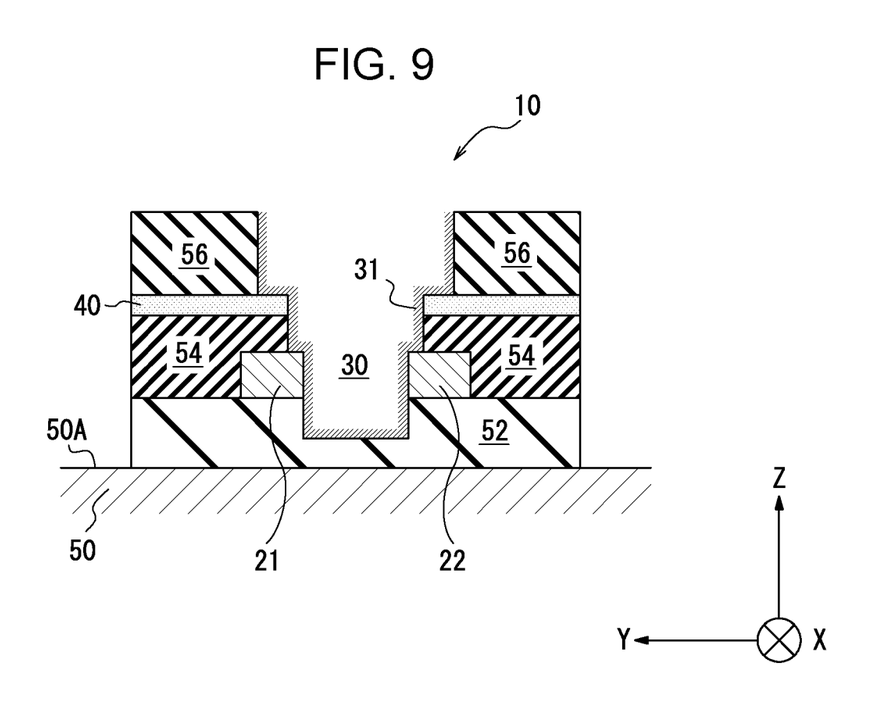
FIG. 9 is a cross-sectional view illustrating an exemplary configuration where, in plan view, a mask does not overlap at least part of a side of a second surface of each waveguide adjacent to the groove.
Figure 10:
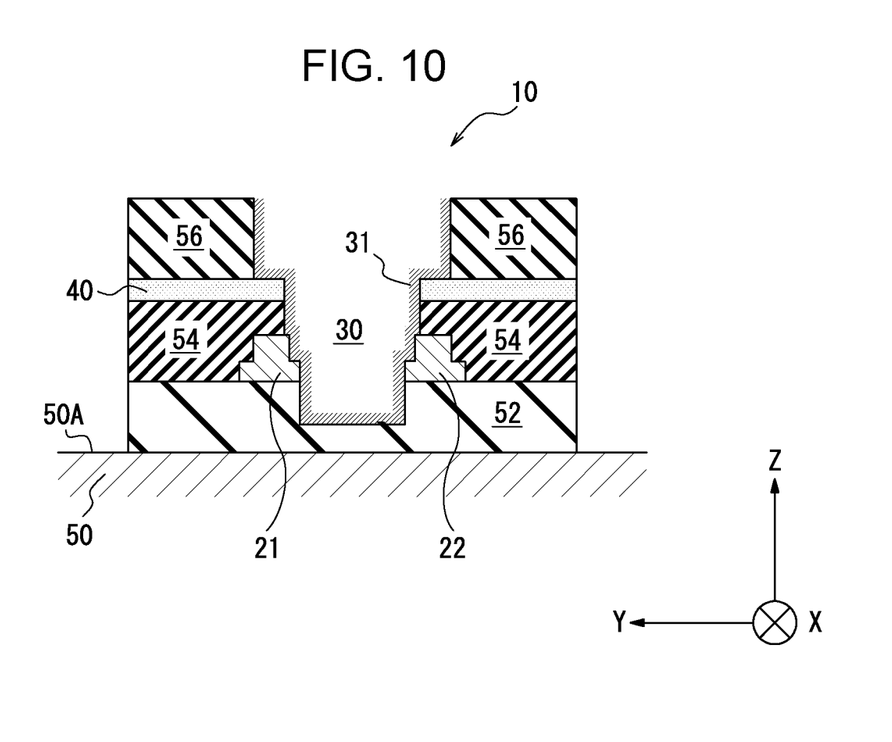
FIG. 10 is a cross-sectional view illustrating an exemplary configuration where the waveguides illustrated in FIG. 9 are ribbed in cross-section.

As illustrated in FIG. 9, the mask 40 may be disposed not to overlap a particular part of the waveguide in plan view of the substrate 50. This facilitates exposure of the waveguide at the side portion of the groove 30, and also facilitates contact of the waveguide with the non-reciprocal member 31. The performance of the isolator 10 can thus be stabilized. Also, the process of manufacturing the isolator 10 can be simplified. As illustrated in FIG. 10, the waveguides may be ribbed in cross-section.

Figure 11:
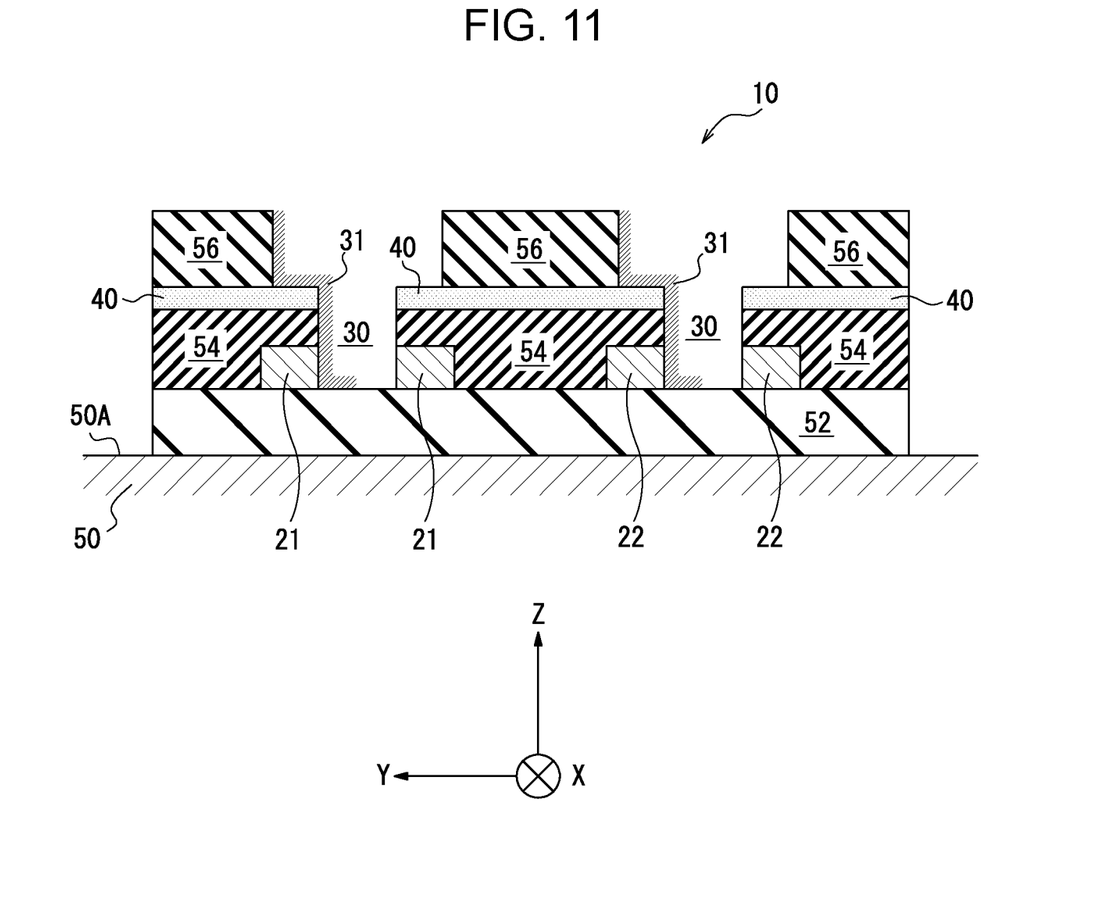
FIG. 11 is a cross-sectional view illustrating an exemplary configuration where the non-reciprocal member is deposited on only one of two side portions of each groove.

As described above, the non-reciprocal member 31 in the groove 30 may be asymmetrically deposited on side portions on both sides of the groove 30. As illustrated in FIG. 11, the non-reciprocal member 31 may be deposited on only one of two side portions of the groove 30. In this case, the non-reciprocal member 31 is not in contact with the waveguide to the right of the groove 30. However, since the waveguides on both sides of the groove 30 are connected in series, the total length along which the waveguides are in contact with the non-reciprocal member 31 can be adjusted in either of the first waveguide 21 and the second waveguide 22. Depositing the non-reciprocal member 31 on only one side portion of the groove 30 can ensure stable deposition of the non-reciprocal member 31 on the one side portion of the groove 30, and thus can achieve improved performance of the isolator 10.

Figure 12:
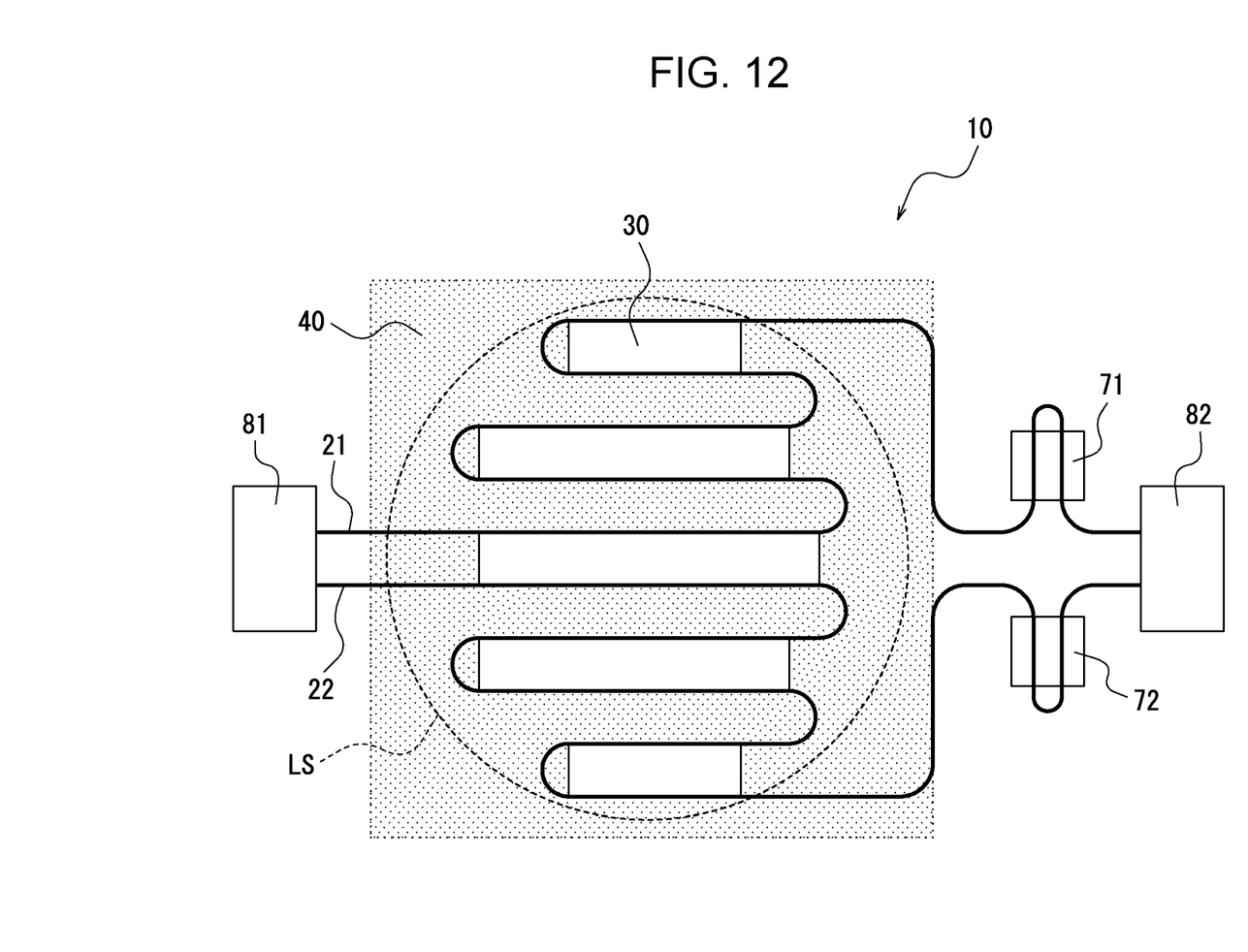
FIG. 12 is a plan view illustrating an exemplary configuration of the isolator further including heaters.

The phase of an electromagnetic wave propagating through the waveguide also changes with the temperature of the waveguide. To adjust the phase of the electromagnetic wave, the isolator 10 may control the temperature of the waveguide. As illustrated in FIG. 12, the isolator 10 may further include heaters 71 and 72 configured to control the temperatures of respective parts of the first waveguide 21 and the second waveguide 22. The heater 71 is capable of controlling the temperature of part of the first waveguide 21, and the heater 72 is capable of controlling the temperature of part of the second waveguide 22. Therefore, even if the waveguide formed above the substrate 50 has an error in line length, the isolator 10 can compensate for the resulting phase difference by means of temperature control. This can improve the performance of the isolator 10.

In FIG. 12, the waveguides each are bent 180 degrees with a small radius of curvature, at the position of the corresponding one of the heaters 71 and 72. By thus bending each waveguide with a small radius of curvature, a transverse magnetic (TM) mode electromagnetic wave passing through the bent portion is emitted outward and removed. In the isolator 10 of the present embodiment, combining the waveguides with the non-reciprocal member 31 produces non-reciprocity in TE mode electromagnetic waves. With the portions for removing TM mode electromagnetic waves, the propagation of TM mode electromagnetic waves from the second branching unit 82 toward the first branching unit 81 can be reduced. The portions for removing TM mode electromagnetic waves are collectively referred to as a filter. Examples of the filter include not only the portion of the waveguide bent with a small radius of curvature, but also a directional coupler configured not to allow coupling of TM mode electromagnetic waves.

The isolator 10 may be configured in such a way that a distance along which the first waveguide 21 is in contact with the non-reciprocal member 31 is equal to a distance along which the second waveguide 22 is in contact with the non-reciprocal member 31. This facilitates phase adjustment, and thus can improve performance of the isolator 10.

Method for Manufacturing Isolator 10

A method for manufacturing the isolator 10 according to the present embodiment will now be described with reference to cross-sectional views of FIG. 13A to FIG. 13F.

Figure 13A:
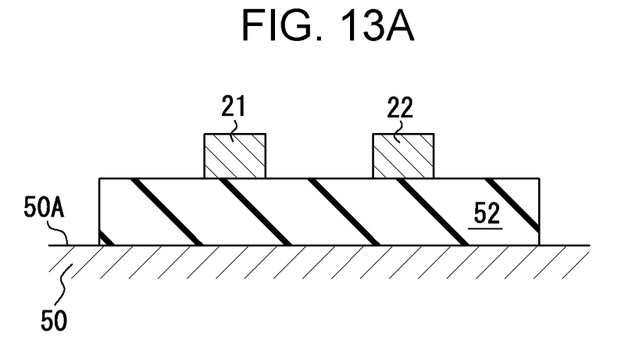
FIG. 13A is a cross-sectional view illustrating a step of forming waveguides above a substrate.

As illustrated in FIG. 13A, the first waveguide 21 and the second waveguide 22 are formed on the BOX layer 52 disposed on the substrate 50. The waveguides may be formed by combination of a depositing step and an etching step. The depositing step may involve plasma chemical vapor deposition (CVD) or sputtering. The etching step may involve dry etching, such as reactive ion etching (RIE), or wet etching.

Figure 13B:
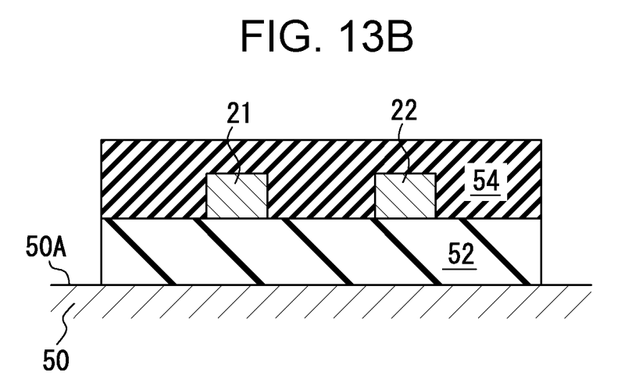
FIG. 13B is a cross-sectional view illustrating a step of forming a first insulating layer over the waveguides.
Figure 13C:
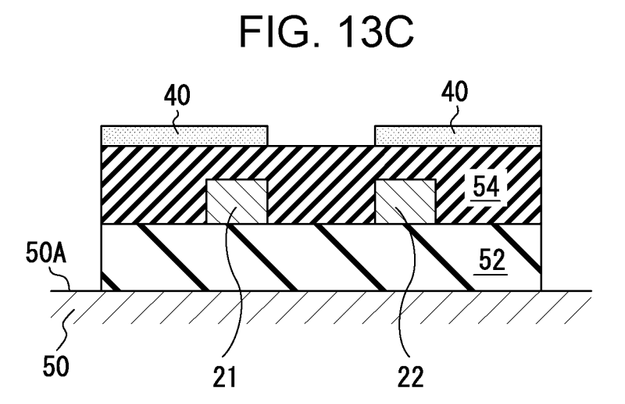
FIG. 13C is a cross-sectional view illustrating a step of forming a mask on the first insulating layer.
Figure 13D:
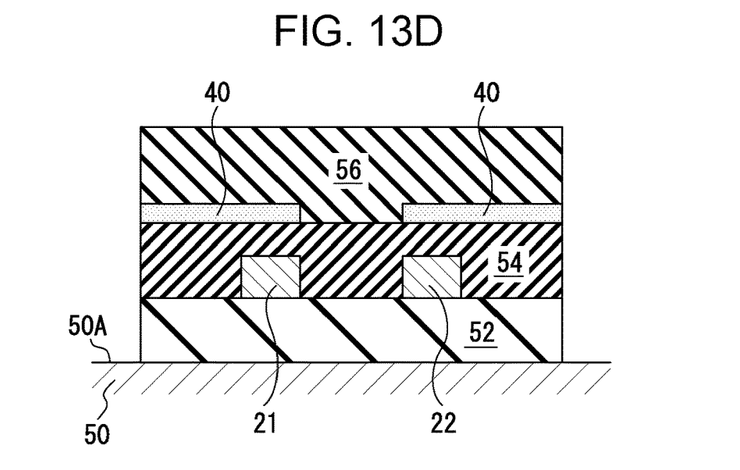
FIG. 13D is a cross-sectional view illustrating a step of forming a second insulating layer over the mask.

As illustrated in FIG. 13B, the first insulating layer 54 is formed on the first waveguide 21 and the second waveguide 22. For example, the first insulating layer 54 may be deposited by plasma CVD. As illustrated in FIG. 13C, the mask 40 is formed on the first insulating layer 54. The mask 40 may be formed by combination of the depositing step and the etching step. As illustrated in FIG. 13D, the second insulating layer 56 is formed on the mask 40. For example, the second insulating layer 56 may be deposited by plasma CVD.

Figure 13E:
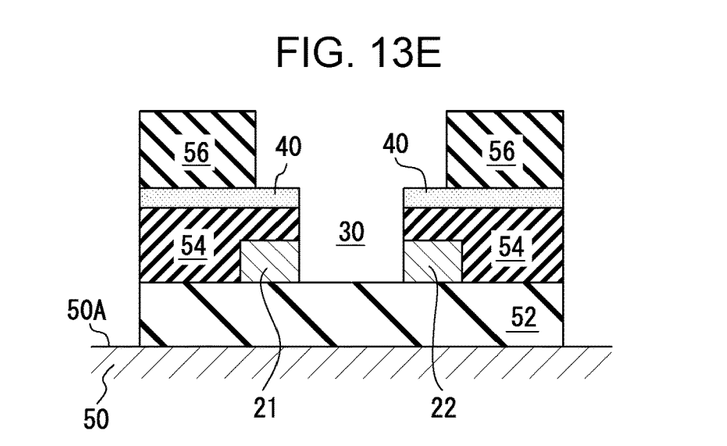
FIG. 13E is a cross-sectional view illustrating a step of forming a groove in such a way as to expose side faces of the respective waveguides.

The groove 30 is formed as illustrated in FIG. 13E. The groove 30 may be formed by dry etching. Part of the groove 30 in the first insulating layer 54 may be formed by dry etching which involves using the mask 40 as an etching mask. Wet etching may be additionally performed to expose the waveguide at the side portion of the groove 30.

Figure 13F:
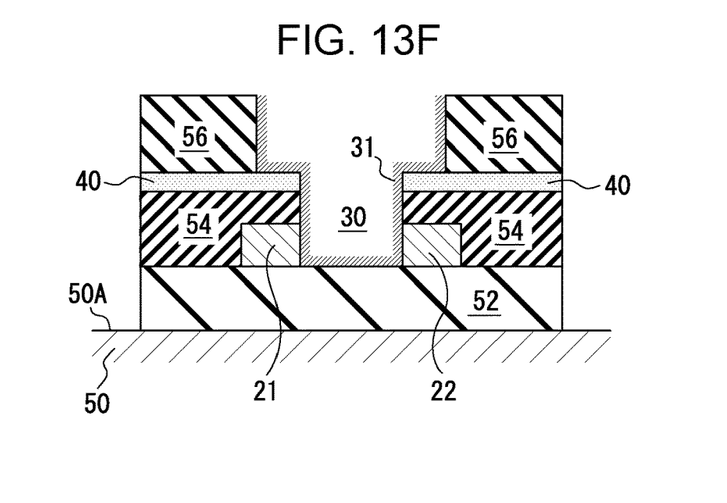
FIG. 13F is a cross-sectional view illustrating a step of forming a non-reciprocal member in the groove.

As illustrated in FIG. 13F, the non-reciprocal member 31 is formed on the side portion and the bottom portion of the groove 30. For example, the non-reciprocal member 31 may be deposited by sputtering. The non-reciprocal member 31 is then irradiated with laser light. The laser irradiation heats the non-reciprocal member 31. Controlling the temperature and duration of heating of the non-reciprocal member 31 can control the degree of crystallization of the non-reciprocal member 31.

The isolator 10 can be manufactured as described with reference to FIG. 13A to FIG. 13F. By additional laser irradiation after completion of production of the isolator 10, the characteristics of the isolator 10 can be adjusted even after the completion of production.

Applications of Isolator 10

The isolator 10 may be used in combination with a component capable of transmitting electromagnetic waves. The isolator 10 may be applied to an optical switch, an optical transceiver, or a data center. For example, the isolator 10 may be applied to an electromagnetic wave transmitter. The electromagnetic wave transmitter includes the isolator 10 and a light source. In the electromagnetic wave transmitter, the isolator 10 receives an electromagnetic wave from the light source and outputs an electromagnetic wave toward a receiver. The isolator 10 is configured in such a way that the transmittance of an electromagnetic wave propagating from the light source toward the receiver is greater than the transmittance of an electromagnetic wave propagating from the receiver toward the light source. This makes it difficult for electromagnetic waves to enter the light source. The light source can thus be protected.

The light source may be a semiconductor laser, such as a laser diode (LD) or a vertical-cavity surface-emitting laser (VCSEL). The light source may include devices configured to emit not only visible light, but also electromagnetic waves of various wavelengths. The light source may be disposed on the substrate 50 of the isolator 10. The isolator 10 may receive a TE mode electromagnetic wave from the light source.

The electromagnetic wave transmitter may further include a modulator and a signal input unit. The modulator carries out modulation by varying the intensity of an electromagnetic wave. The modulator may be interposed between the isolator 10 and the receiver, not between the light source and the isolator 10. For example, the modulator may pulse-modulate an electromagnetic wave. The signal input unit receives a signal input, for example, from an external device. The signal input unit may include, for example, a digital-to-analog (D/A) converter. The signal input unit outputs a signal to the modulator. The modulator modulates an electromagnetic wave on the basis of a signal acquired by the signal input unit.

The light source may include a modulator and a signal input unit. In this case, the light source may output a modulated electromagnetic wave to the isolator 10.

The electromagnetic wave transmitter may be mounted on the substrate 50. The light source may be mounted in such a way as to be connected to the first branching unit 81, with the modulator interposed therebetween. The light source may be mounted in such a way as to be connected to the first branching unit 81, without the modulator interposed therebetween. The receiver may be mounted in such a way as to be connected to the second branching unit 82, without the modulator interposed therebetween. The receiver may be mounted in such a way as to be connected to the second branching unit 82, with the modulator interposed therebetween. In this case, the modulator may be mounted in such a way as to be connected to the second branching unit 82.

Although embodiments of the present disclosure have been described on the basis of drawings and examples, it is to be noted that various modifications or changes can be made to the present disclosure by any person skilled in the art. Therefore, it is to be noted that these modifications or changes are included in the scope of the present disclosure. For example, functions included in each component can be rearranged in a logically non-contradictory way. A plurality of components may be combined into a single one, or may each be divided into sub-components.

In the present disclosure, the terms such as "first" and "second" are identifiers used to distinguish different components. In the present disclosure, the ordinal numbers, such as "first" and "second", assigned as identifiers to components are interchangeable. For example, "first" and "second" of the first waveguide 21 and the second waveguide 22 are interchangeable. The identifiers are interchanged at the same time. The components are distinguishable even after the identifiers are interchanged. The identifiers may be deleted. Without the identifiers, the components are distinguished with symbols. In the present disclosure, identifiers, such as "first" and "second", are not to be used to interpret the order of the components, or as a basis for the presence of identifiers with smaller ordinal numbers.

In the present disclosure, the X axis, the Y axis, and the Z axis are provided for convenience of explanation, and are interchangeable. In the present disclosure, components have been described using a rectangular coordinate system defined by the X axis, the Y axis, and the Z axis. In the present disclosure, the positional relations of components may not necessarily be orthogonal.

What is claimed is:

1. An isolator comprising:
    a substrate having a substrate surface;
    a waveguide disposed above the substrate surface, the waveguide having
        a first surface facing the substrate surface,
        a second surface opposite the first surface, and
        a side face connecting the first surface to the second surface, the side face extending along a direction which electromagnetic wave propagates;
    a groove comprising
        a bottom portion, and
        a side portion configured to expose at least part of the side face of the waveguide;
    a mask disposed above and overlapping at least a region of the second surface of the waveguide as viewed in a direction normal to the substrate surface, the region being in contact with the groove; and
    a non-reciprocal member disposed in the groove and being in contact with the side face of the waveguide.

2. The isolator according to claim 1, wherein the non-reciprocal member contains yttrium iron garnet or YIG.

3. The isolator according to claim 1, wherein a transmittance of light through the mask is less than a transmittance threshold.

4. The isolator according to claim 1, wherein the waveguide is arranged in a meandering pattern in a substantially circular region, as viewed in a direction normal to the substrate surface.

5. The isolator according to claim 1, wherein in a direction normal to the substrate surface, the bottom portion of the groove is disposed at a substantially same position as the first surface of the waveguide.

6. The isolator according to claim 1, wherein in a direction normal to the substrate surface, the bottom portion of the groove is disposed at a position lower than the first surface of the waveguide.

7. The isolator according to claim 1, wherein the waveguide comprises a filter configured to transmit a transverse electric or TE mode electromagnetic wave and remove a transverse magnetic or TM mode electromagnetic wave.

8. The isolator according to claim 1, wherein the waveguide comprises a first waveguide and a second waveguide.

9. The isolator according to claim 8, wherein at least part of the groove comprises
    a first side portion configured to expose at least part of a side face of the first waveguide, and
    a second side portion configured to expose at least part of a side face of the second waveguide.

10. The isolator according to claim 8, wherein a distance along which the first waveguide is in contact with the non-reciprocal member is equal to a distance along which the second waveguide is in contact with the non-reciprocal member.

11. The isolator according to claim 8, further comprising heaters each configured to control a temperature of a corresponding one of the first waveguide and the second waveguide.

* * * * *